(12) United States Patent
Schmal et al.

(10) Patent No.: US 8,592,016 B2
(45) Date of Patent: Nov. 26, 2013

(54) THERMOPLASTIC ELASTOMER FILMS

(75) Inventors: Michael D. Schmal, Orwigsburg, PA (US); Ernest E. Bachert, Orwigsburg, PA (US); John A. Menges, Auburn, PA (US)

(73) Assignee: M&Q IP Leasing, Inc., Wilmington, DE (US)

( * ) Notice: Subject to any disclaimer, the term of this patent is extended or adjusted under 35 U.S.C. 154(b) by 1616 days.

(21) Appl. No.: 11/531,009

(22) Filed: Sep. 12, 2006

(65) Prior Publication Data

US 2007/0077378 A1    Apr. 5, 2007

Related U.S. Application Data

(60) Provisional application No. 60/722,721, filed on Sep. 30, 2005.

(51) Int. Cl.
| | | |
|---|---|---|
| *B32B 1/02* | (2006.01) | |
| *C08F 283/04* | (2006.01) | |
| *C08G 69/48* | (2006.01) | |
| *C08L 67/00* | (2006.01) | |
| *C08L 77/00* | (2006.01) | |

(52) U.S. Cl.
USPC ....... 428/35.5; 428/34.1; 428/35.2; 428/35.7; 428/36.8; 428/36.92; 525/425

(58) Field of Classification Search
USPC ......... 428/34.1, 35.2, 35.5, 35.7, 36.8, 36.92, 428/411.1, 474.4, 475.5, 480; 525/425
See application file for complete search history.

(56) References Cited

U.S. PATENT DOCUMENTS

| | | | |
|---|---|---|---|
| 3,995,084 A | | 11/1976 | Berger et al. |
| 5,164,445 A | * | 11/1992 | Nishida et al. ................. 525/41 |
| 5,534,277 A | | 7/1996 | Ramesh et al. |
| 5,908,406 A | * | 6/1999 | Ostapchenko et al. .... 604/96.01 |
| 5,939,183 A | | 8/1999 | Kuratsuji et al. ............. 428/324 |
| 6,063,505 A | | 5/2000 | Kuratsuji et al. ............. 428/516 |
| 6,203,750 B1 | * | 3/2001 | Ahlgren et al. ............... 264/514 |
| 6,682,792 B2 | | 1/2004 | Schmal et al. ............... 428/35.2 |
| 7,223,017 B2 | * | 5/2007 | Weaver ........................... 383/63 |
| 7,727,604 B2 | * | 6/2010 | Schiffmann ................. 428/34.8 |
| 2003/0021925 A1 | | 1/2003 | Schmal et al. |

FOREIGN PATENT DOCUMENTS

| | | | |
|---|---|---|---|
| EP | 1767348 A1 | 3/2007 | |
| JP | 08-176352 A | 7/1996 | |
| JP | 09-227696 A | 9/1997 | |
| JP | 09-286077 A | 11/1997 | |
| JP | 10-264315 A | 10/1998 | |
| JP | 2002-316388 A | 10/2002 | |
| WO | 02/082913 | 10/2002 | |
| WO | WO 2004103079 | * 12/2004 | ............. A22C 13/00 |

OTHER PUBLICATIONS

Polyesters, Elastomeric, Encyclopedia of Polymer Science and Engineering, 1985, 12, 75-117: John Wiley & Sons, Inc.
Supplemental European Search Report dated Dec. 1, 2011.
"Smoking Meat," http://www.wedlinydomowe.com/meat-smoking.
"Smoked Sausages," http://www.wedlinydomowe.com/sausage-types/smoked-sausage, copyright 2012.
"Cooking Meat," http://www.wedlinydomowe.com/sausage-making/cooking-meat, copyright 2012.
"UBE 5033B Air Blown Nylon 6/66 Film," http://www.matweb.com/search/datasheettext.aspx?matguid=f33c04b4ef3a4e5184720fd381ae2858.
Selar® resins Product Data Sheet Jan. 7, 2010.
BASF Product Information Jul. 1, 2004.

* cited by examiner

*Primary Examiner* — Walter B Aughenbaugh
(74) *Attorney, Agent, or Firm* — Pepper Hamilton LLP

(57) ABSTRACT

Provided are high temperature food preparation films, bags made from the films, as well as methods for fabricating such bags. The high temperature food preparation films are composed of a blended monolayer thermoplastic elastomer film comprising a polyamide and a polyester elastomer. The polyamides include nylon-6, nylon-6,6, copolymers of nylon-6, copolymers of nylon-6,6, and combinations thereof. Bags made from such films are used in high temperature cooking applications of up to about 425° F.

16 Claims, No Drawings

THERMOPLASTIC ELASTOMER FILMS

CROSS REFERENCE TO RELATED APPLICATION

The present application claims priority to U.S. Provisional Patent Application No. 60/722,721, filed Sep. 30, 2005, the entire contents of which are incorporated herein by reference.

FIELD OF THE INVENTION

The present application relates generally to thermoplastic films, products made from thermoplastic films, and methods for making such products. More particularly, the present application relates to polyester/polyamide blend films for use in high temperature applications, bags made from such films, and methods for making such films and bags.

BACKGROUND OF THE INVENTION

Various thermoplastic films have been used to package, preserve, and encase food products. Conventional films are composed of, for example, polypropylene and polyethylene. Optional adhesive layers may be used to combine individual film layers.

Bags made from conventional films are often used for hot water cooking applications. For example, rice and pasta are often cooked in "boil-in" bags.

Conventional bags, however, are unsuited for high temperature cooking applications, such as for example cooking poultry or other meats, because they either melt or adhere to the food product retained therein. Materials that are conventionally used to reduce meat adhesion, such as polyethylene, unfortunately have low softening temperatures and low melt temperatures thereby making them poor choices for high temperature cooking applications.

Conventional bags are also typically not durable enough to be used in high pressure meat casing applications where meat is stuffed into a casing. For example, bags used as meat casing require the ability to elongate significantly before breakage occurs.

The heat sealing of conventional cooking bags is typically accomplished by applying sufficient heat and pressure to adjacent film surfaces for a sufficient period of time in order to produce a fusion bond between the adjacent surfaces. However, heat seals are vulnerable to imperfection where the heat necessary to seal the folds of stock will harm the barrier properties of the film by overly thinning the film layer or melting through the film. Imperfect seals are particularly problematic in cooking applications where exposure to elevated temperatures and heat shrinking can further increase the stress imposed on such seals. While mechanical sealing techniques such as those that make use of clips, rings, or other mechanical devices may substituted for heat sealing, mechanical sealing is associated with a number of undesirable effects such as contamination when the sealing device becomes lost in the packaged product or inability to be used with microwave cooking applications where the sealing device is metallic, as is often the case.

Accordingly, film compositions used in high temperature cooking applications, that may be heat sealed without harmfully influencing desired barrier properties, are desired by the packaging industry.

SUMMARY

Provided are high temperature food preparation films, bags made from the films, and methods for making the films and bags. The high temperature food preparation films are composed of a blended monolayer thermoplastic film. The blended monolayer thermoplastic film is composed of a blend of thermoplastic elastomer and a polyamide. The high temperature food preparation films are useful in the food handling industry and particularly in the meat packaging industry and for use in cooking bag applications.

Thermoplastic elastomers include polyester elastomer, polyether-ester block copolymers, polyester-ester block copolymers, and polyether block polyamide copolymers. Polyamides include nylons and aromatic nylons, such as for example nylon-6, nylon-11, nylon-4,6, nylon-6,6, nylon-6,9, nylon-6,10, nylon-6,11, nylon-6,12, nylon-10,12, and copolymers thereof, and combinations thereof.

High temperature food preparation films comprise from about 10 to about 90 weight percent, based on the total weight of said blended monolayer thermoplastic film, of polyamide, and, from about 10 to about 90 weight percent, based on the total weight of said blended monolayer thermoplastic film, of thermoplastic elastomer. In a preferred embodiment, the blended monolayer thermoplastic film comprises, based on the total weight of said monolayer thermoplastic film, about 48% nylon-6, about 32% nylon-6,6, and about 20% polyester elastomer.

High temperature food preparation films display favorable characteristics with respect to durability, toughness, elasticity, vapor permeability, responsiveness to heat sealing, temperature tolerability, and non-stick properties, i.e., resistance to meat adhesion, among other desirable traits. More particularly, the provided high temperature food preparation films and bags exhibit low adhesion to products that are packaged therein, such as food items, when exposed to high temperature cooking conditions. When used for cooking applications, the high temperature food preparation films permit favorable browning of food items due to the advantageous degree of vapor transmission across the film material.

Methods of fabricating high temperature food preparation films include cast film extrusion techniques, biaxial orientation film processing techniques, sheet extrusion techniques, profile extrusion techniques, and blown film extrusion techniques.

There are also disclosed bags made from high temperature food preparation films, which include a sealed end, at least one side wall extending away from said sealed end, and a open end. The side wall includes an edge distal to the sealed end, which defines the open end. The bags made from high temperature food preparation films may be fabricated from blended thermoplastic films that are fused together by sealing techniques selected from the group including heat sealing techniques such as wire impulse sealing techniques, impulse sealing techniques, rotary heat sealing, hot knife heat sealing, hot bar sealing, and ultrasonic sealing techniques.

DETAILED DESCRIPTION OF ILLUSTRATIVE EMBODIMENTS

Provided are high temperature food preparation films, bags made from the films, and methods for making the films and bags. The high temperature food preparation films are composed of a blended monolayer thermoplastic film composed of a thermoplastic elastomer and a polyamide. Methods of fabricating high temperature food preparation films include conventional extrusion techniques and biaxial orientation film processing techniques. Bags made from high temperature food preparation films are fabricated from blended thermoplastic films that are fused together by sealing techniques.

These methods of preparing films and bags are useful in industrial, or otherwise large scale, as well as small-scale, food preparation enterprises, particularly in the commercial meat-preparation trade. Non-commercial, domestic uses for the present invention are also contemplated.

As used herein, references to cooking temperatures or high-heat cooking applications indicate temperatures from about 200° F. to about 550° F.

Thermoplastic elastomers include any conventional thermoplastic elastomer known to those skilled in the art, including for example, polyether-ester block copolymers, polyester-ester block copolymers, and polyether block polyamide copolymers, and combinations thereof. Thermoplastic elastomers are preferably prepared by melt trans-esterification of a carboxylic acid, or its methyl ester, a polyalkylene oxide, and a short chain diol. Typical thermoplastic elastomers, including polyether-ester block copolymers, polyester-ester block copolymers, and synthesis thereof, are described in the ENCYCLOPEDIA OF POLYMER SCIENCE AND TECHNOLOGY, VOL. 12, PP. 76-177 (JOHN WILEY & SONS, INC. 1985), which is incorporated herein by reference in its entirety.

A preferred thermoplastic elastomer is polyester elastomer. Polyester elastomer include any conventional polyester elastomer known to those skilled in the art, including for example polyether-ester block copolymers and polyester-ester block copolymers.

Polyester elastomers are commercially available under various trademarked names. For example, Arnitel® from Royal DSM Engineering, Hytrel® from DuPont, and Riteflex® from Ticona are common registered trademarked names for exemplary polyether-ester and polyester-ester block copolymers. PEBAX®, made by ATOFINA Chemicals, Inc. is a commercially available polyether block polyamide copolymer stock. A preferred thermoplastic elastomer is the Arnitel® product line commercially available from DSM Engineering. A more preferred commercially available thermoplastic elastomer is Arnitel® EM630 polyester elastomer (Royal DSM, Herleen, the Netherlands).

Polyamides include any polyamides known to those skilled in the art, such as, for example, nylons and aromatic nylons. Preferably the polyamide is a nylon. Nylons include for example, nylon-6, nylon 11, nylon-4,6, nylon-6,6, nylon-6,9, nylon-6,10, nylon-6,11, nylon-6,12, nylon-10,12, and copolymers and combinations thereof. More preferably the polyamide is nylon-6, nylon-6,6, copolymers of nylon-6, copolymers of nylon-6,6, or combinations thereof.

Polyamides are available under different trademarked or otherwise commercial names. For example, Vydyne® from Solutia, Inc., and Zytel® from DuPont are common commercial sources for different nylons. A preferred commercially available nylon-6 is BASF B4OLN01 nylon-6, from BASF Drucksysteme GmbH, Stuttgart, Germany, and a preferred commercially available source of nylon-6,6 is Vydyne® 66J heat stabilized nylon-6,6 (Solutia, Inc., Gonzales, Fla.). A preferred aromatic nylon is Kevlar®.

Blended monolayer thermoplastic films may also optionally include additives to provide or enhance a particular desired characteristic of the film composition. Typical additives include, stabilizers, slip additives, antistats, antioxidants, colorants, dyes, or pigments, antifogs, heat stabilizers, antimicrobials, oxygen scavengers, scents, processing agents, and the like, which may be incorporated into the film. It will be understood by those skilled in the art that any additional component that does not alter the desired characteristics of the film composition may be included in the blended monolayer thermoplastic films.

High temperature food preparation films are useful in the food handling industry, and particularly in the meat packaging industry, and for use in cooking bag applications. In accordance with one embodiment, there are provided blended monolayer thermoplastic films for use in high temperature applications comprising from about 90 to about 10 weight percent, based on the total weight of said blended monolayer thermoplastic film, of one or more polyamide polymers, and, from about 10 to about 90 weight percent, based on the total weight of said blended monolayer thermoplastic film, of thermoplastic elastomer. In another embodiment, the film comprises from about 50 to about 90 weight percent, based on the total weight of said monolayer thermoplastic film, of polyamide, and from about 10 to about 30 weight percent, based on the total weight of said monolayer thermoplastic film, of polyester elastomer.

In a preferred embodiment, the blended monolayer thermoplastic film comprises from about 40 to about 60 weight percent, based on the total weight of said monolayer thermoplastic film, of nylon-6, from about 20 to about 40 weight percent, based on the total weight of said monolayer thermoplastic film, of nylon-6,6, and, from about 10 to about 30 weight percent, based on the total weight of said monolayer thermoplastic film, of polyester elastomer. More preferably, the film comprises, based on the total weight of said monolayer thermoplastic film, about 48% nylon-6, about 32% nylon-6,6, and about 20% polyester elastomer.

High temperature food preparation films may be utilized in cooking conditions from about 200° F. to about 550° F. Preferably, the present high temperature food preparation films are utilized in cooking conditions from about 210° F. to about 475° F. More preferably, the high temperature food preparation films are utilized in cooking conditions from about 210° F. to about 450° F., from about 210° F. to about 425° F., or from about 275° F. to about 425° F. More preferably yet, the disclosed films are utilized in cooking conditions from about 350° F. to about 425° F.

High temperature food preparation films display favorable characteristics with respect to durability, toughness, elasticity, vapor permeability, responsiveness to heat sealing, temperature tolerability, and non-stick properties, i.e., resistance to meat adhesion, among other desirable traits. More particularly, high temperature food preparation films and bags exhibit low adhesion to products that are packaged therein, such as food items, when exposed to a high heat environment. When used for cooking applications, they also provide a favorable rate of browning of food items that are stored in the film or film bags, due to the advantageous degree of vapor transmission across the film material.

The disclosed films exhibit low adhesion to products, such as food items, that are packaged therein, when exposed to a high heat environment. Nylon polymer chains possess hydroxyl, i.e., polar, groups that render the nylon polymer a polar molecule. This physical characteristic causes nylon film to display a tremendous affinity to meat protein, and it is for this reason that nylon has traditionally been employed in meat casings. When used in this manner, nylon film sticks to the meat and remains in intimate contact with it, thereby preventing moisture or "purge" from emanating from the meat during cooking. This phenomenon helps maintain the weight of the cooked meat and increases the "cook yield" of the meat product. However, if the degree of meat adhesion to a casing film is too great, portions of the packaged meat can be pulled off with the film when the casing is stripped off, and where significant quantities of meat becomes stripped off, the meat packer's yield is reduced and the profitability of the resulting product is diminished. Therefore, excessive adhesion of a packaging material to a packaged product, especially a food product, although often encountered, is not desired.

Most sausages and deli meats are cooked at temperatures below 210° F. To reduce meat adhesion under such conditions, it is known that certain non-polar polymers such as polyethylene may be blended with nylon to diminish its adhesive affect. By blending a specific quantity of polyethylene with nylon, the optimum amount of meat adhesion may be obtained, such that purge is reduced but no meat is stripped off upon removal of the casing. Thus, reducing meat adhesion that is associated with low temperature cooking is known in the industry.

However, the problem of adhesion becomes more acute under high temperature cooking conditions (greater than 210° F.) because materials that are conventionally used to reduce meat adhesion, like polyethylene, have low vicat softening points and low crystalline melt point temperatures. Polyethylene vicat softening point is typically around 210° F. and crystalline melt point is around 248° F. The problem becomes even more intractable when it is recognized that if it is desired to blend nylon with a different polymer, the chosen polymer must be soluble in nylon to ensure proper blending and ability to form the resulting product into film. Additionally, the chosen polymer must be safe to use with food contact applications, especially where high temperatures are utilized.

In one embodiment, high temperature food preparation films are composed of thermoplastic elastomer that is Arnitel® EM630 polyester elastomer (Royal DSM, Herleen, the Netherlands). This polyester elastomer exhibits lower meat adhesion compared to nylon. It also has a crystalline melt point temperature (414° F.) that is comparable to that of nylon, is soluble in nylon, and is safe for food contact. The present films show that the blending of polyamides such as nylon with thermoplastic elastomer in specific proportions yields a blended product that may be used to produce packaging films with superior utility at high temperatures, favorable food contact safety profile, and diminished food adhesion properties.

The disclosed films and bags constructed at least partly therefrom also permit an advantageous degree of vapor permeability, a characteristic which promotes browning of a packaged product when used for high temperature cooking applications. Typically, meat that is cooked in a closed pot will not brown because the food item cannot dry out and singe, whereas meat cooked in an open pot can dry out and will singe and become brown. Brown-cooked meat is often more appealing to consumers or other purchasers than non-browned meat. With respect to cooking bags whose interior compartment is sealed off from the ambient cooking atmosphere, the only manner in which moisture may exit the bag is by permeating through the film from which the bag is constructed.

High temperature cooking bags constructed from the disclosed high temperature films brown meat more effectively conventional all-nylon bags. High temperature cooking bags exhibit highly favorable moisture vapor transmission rates and accordingly afford improved browning of packaged products during high temperature cooking applications.

The present high temperature cooking films also exhibit favorable water vapor transmission rates. Preferably, the high temperature cooking films have a water vapor transmission rate of 2 g/100 in$^2$/day or higher. More preferably, the water vapor transmission rate is about 5 g/100 in$^2$/day or greater. In other preferred embodiments, the water vapor transmission rate is about 5 g/100 in$^2$/day to about 10 g/100 in$^2$/day. In a more preferred embodiment, the water vapor transmission rate is about 7.5 g/100 in$^2$/day.

The present high temperature cooking films may have any conventional film thickness. Preferably, high temperature cooking films have a thickness of about of from about 0.45 mil to about 7.0 mil. More preferably the high temperature food preparation films have a thickness from about 0.45 mil to about 5.0 mil, a thickness from about 0.45 mil to about 4.0 mil, or a thickness from about 0.75 mil to about 3.0 mil. More preferably yet, the high temperature food preparation films have a thickness from about 1.0 mil to about 2.5 mil.

The present high temperature cooking films may have a film thickness of about 0.002" thick, i.e., 2 mil, exhibit water vapor transmission rate of at least 2 g/100 in$^2$/day or higher, and preferably at least about 5 g/100 in$^2$/day or greater. In one embodiment, 2 mil high temperature cooking films exhibit a water vapor transmission rate of about 5 g/100 in$^2$/day to about 10 g/100 in$^2$/day.

The provided cooking films advantageously display both toughness and plasticity, as measured by such physical characteristics as tensile strength, elongation, and tear strength initiation. The films will be required to endure significant stresses during the packaging process, and, during cooking, exposure to high temperatures may require an enhanced degree of durability. Additional advantages provided by the disclosed high temperature cooking films and bags include such toughness and enhanced durability. In contrast to pure nylon films, which are typically stiff and unable to elongate compared to thermoplastic elastomer films, the present high temperature cooking films and bags, being produced from a blend of polyamide and thermoplastic elastomer, exhibit higher elongation and are tougher than conventional all-nylon bags. The physical characteristics of tensile strength, elongation, and tear strength initiation can be used to measure the toughness and plasticity attributes of a film composition.

Tensile strength typically measures the maximum tensile stress sustained by a composite specimen before it fails in a tension test. In some embodiments, the disclosed blend films display a tensile strength from about 6,000 psi to about 25,000 psi. In preferred embodiments, the films have a tensile strength from about 9,000 psi to about 16,500 psi, or from about 10,500 psi to about 15,000 psi.

The elongation of a material describes fractional increase in length of a material stressed in tension. Elongation may be expressed as a percentage of the original length. In some embodiments, the disclosed blend films display an elongation from about 0% to about 700%. In preferred embodiments, the films have an elongation from about 450% to about 600%, and in more preferred embodiments, the elongation is about 480% to about 550%.

Tear strength initiation provides the amount of weight per unit length of material that is required to initiate the tearing of such material. In some embodiments, the disclosed blend films display a tear strength initiation of about 80 g/mil to about 1,200 g/mil. In preferred embodiments, the films have a tear strength initiation from about 550 g/mil to about 900 g/mil, and in a more preferred embodiment, the tear strength initiation is about 580 g/mil to about 850 g/mil.

The disclosed thermoplastic elastomer/polyamide films are also better suited to heat sealing than are many conventional films. Thermoplastic films like polyester elastomer films typically have a lower melt point than polyamide films, including nylon. For example, Arnitel® EM630 polyester elastomer (Royal DSM, Herleen, the Netherlands) has a melt point temperature of 414° F., while BASF B4OLN01 nylon-6 (BASF Drucksysteme GmbH, Stuttgart, Germany) has a melt point of 428° F., and Vydyne® 66J nylon-6,6 (Solutia, Inc., Gonzales, Fla.) has a melt point of 500° F. The lower melt point of the polyester elastomer as compared with those of the nylons will result in a lower melt point possessed by a blend of the three. The lower melt point facilitates heat sealing, because less heat has to be transmitted in order to achieve the melting that is necessary to produce sealing. The disclosed film compositions provide the advantage of being easily and securely heat sealed.

Methods of making thermoplastic films include cast film extrusion, biaxial orientation film processing, sheet extrusion, profile extrusion, or blown film extrusion. For example, blended monolayer thermoplastic films may be made by preparing a melt blend of thermoplastic elastomer and polyamide and extruding the melt blend. Other methods of making thermoplastic films are taught by U.S. Pat. No. 6,682,792 B2 which is incorporated herein by reference in its entirety.

There are also provided bags for holding a product, such bags including a sealed end, at least one side wall extending away from said sealed end, each of said at least one side wall having a distal edge, and, an open end defined by said distal edge. Films and bags constructed at least in part from the disclosed blended monolayer thermoplastic films are useful in the packaging industry, particularly in the meat packaging industry, and in the food preparation industry. As used herein, "bag" means bags as traditionally defined, vacuum bags, casings, pouches, sacks, and containers used to hold items for packaging, transportation, and cooking.

In one embodiment, a bag is formed from a blended monolayer thermoplastic film comprising from about 90 to about 10 weight percent, based on the total weight of said blended monolayer thermoplastic film, of one or more polyamide polymers; and, from about 10 to about 90 weight percent, based on the total weight of said blended monolayer thermoplastic film, of thermoplastic elastomer. In another embodiment, a bag is formed from a blended monolayer thermoplastic film comprising from about 40 to about 60 weight percent, based on the total weight of said monolayer thermoplastic film, of nylon-6, from about 20 to about 40 weight percent, based on the total weight of said monolayer thermoplastic film, of nylon-6,6, and, from about 10 to about 30 weight percent, based on the total weight of said monolayer thermoplastic film, of polyester elastomer. In a more preferred embodiment, a bag is formed from a blended monolayer thermoplastic film that comprises, based on the total weight of said monolayer thermoplastic film, about 48 weight percent nylon-6, about 32 weight percent nylon-6,6, and about 20 weight percent polyester elastomer.

Bags constructed at least in part from blended monolayer thermoplastic films, display favorable characteristics that are advantageous over conventional thermoplastic bags known in the art. The blending of thermoplastic elastomer with polyamide polymers in the disclosed percentage by weight proportions yields highly desired physical properties as compared with nylon films or thermoplastic elastomer films alone, and also as compared with conventional blended thermoplastic films.

Bags may be constructed using conventional bag making techniques known to those skilled in the art. In one embodiment, bags are produced from a tubular stock of the disclosed films by sealing one end of a length of tubular film or by sealing both ends of the tube and then slitting one edge to form a bag mount. Alternatively, bags may be made from flat sheets of film, by sealing three edges of superimposed sheets of film or alternatively by folding a rectangular sheet in half and sealing the two sides that are proximate to the folded side.

Bags are fabricated from film or films whose edges are fused together by sealing techniques selected from the group including heat sealing techniques such as wire impulse sealing techniques, impulse sealing techniques, rotary heat sealing, hot knife heat sealing, hot bar sealing, and ultrasonic sealing techniques. Heat sealing techniques are preferably used to fabricate the bags described herein.

Also provided are methods for fabricating bags that are constructed at least in part from the disclosed polyester/polyamide blend films. All suitable means of forming an interior compartment that is capable of accommodating a product are contemplated, and bag seals may be formed by heat sealing, ultrasonic sealing, star sealing, or other suitable sealing techniques, although heat sealing is preferred. For example, in one embodiment, a storage bag is formed by the steps of providing a film stock comprising from about 40 to about 60 weight percent of nylon-6, from about 20 to about 40 weight percent of nylon-6,6, and, from about 10 to about 30 weight percent of polyester elastomer, where each weight percent is based on the total weight of the film stock, folding a portion of the film stock to form a folded portion, and heat sealing the folded portion of the film stock to form a seal.

Additionally provided are methods for cooking a food item. Such methods permit the high-temperature preparation of a food item, such as a whole muscle meat like turkey, chicken, ham, or roast beef, in a bag that is suitable both for packaging and for preparation, such that a commercial entity or private consumer can cook a food item in the package in which it was originally stored. Additionally, because of the vapor transmission characteristics of the blended monolayer thermoplastic film, such methods also permit the in-bag browning and crisping of the packaged food item. Another advantage provided by the disclosed methods is the ability to perform cooking applications on such products as whole muscle meats without undesired adhesion of the packaging material to the enclosed food product. For example, in a preferred embodiment, a method of cooking a food item is provided that includes the step of providing a bag constructed at least in part from a blended monolayer thermoplastic film comprising from about 40 to about 60 weight percent of nylon-6, from about 20 to about 40 weight percent of nylon-6,6, and from about 10 to about 30 weight percent of polyester elastomer, where each weight percent is based on the total weight of the blended monolayer thermoplastic film, followed by heating the bag at a temperature from about 210° F. to about 425° F. In another embodiment, the heating step also includes the browning or crisping of the packaged food item. Such method advantageously permits a user to brown or crisp a food item, such as a portion of meat, without requiring any further manipulation of the food preparation bag after it has been placed in an oven or other cooking apparatus, and without concern that the bag material will adhere to and strip away portions of the enclosed food item.

Those skilled in the art will appreciate that numerous changes and modifications may be made to the above described preferred embodiments and that such changes and modifications may be made without departing from the spirit of the invention. It is therefore intended that the appended claims cover all such equivalent variations as fall within the true spirit and scope of the invention. When ranges are used herein for physical or chemical properties, such as temperature, all combinations and sub-combinations of ranges and specific embodiments therein are intended to be included.

EXAMPLES

Certain aspects of the present invention are further defined in the following examples. It should be understood that these examples, while indicating certain embodiments of the invention, are given by way of illustration only, and should not be construed as limiting the appended claims. From the preceding discussion and these examples, one skilled in the art can ascertain the characteristics of the claimed inventions, and without departing from the spirit and scope thereof, may make various changes and modifications of the invention to adapt it to various usages and conditions.

Example 1

Physical Characteristics

A blended monolayer thermoplastic film was prepared to test its physical properties and suitability for packaging and high-temperature applications. The blended monolayer thermoplastic film comprised, 48% nylon-6, 32% nylon-6,6, and 20% polyester elastomer, based on the total weight of said monolayer thermoplastic film. The nylon-6 stock was provided from BASF B4OLN01 (BASF Drucksysteme GmbH, Stuttgart, Germany); the nylon-6,6 stock was Vydyne® 66J heat-stabilized nylon-6,6 (Solutia, Inc., Gonzales, Fla.); and, polyester elastomer stock was Arnitel® EM630 polyester elastomer (Royal DSM, Herleen, the Netherlands). The film stock was formed using blown film extrusion, resulting in a film with a thickness of 2.25 mm. Area yield was measured as 10,720 in$^2$/lb. Conventional testing methodologies were used to measure tensile strength, elongation, tear strength initiation, and water vapor transmission rate. Table 1 provides the results of these assays and identifies the test methods used to obtain the described measurements.

TABLE 1

| Physical Property | Established Value | Test Method |
| --- | --- | --- |
| Thickness (mm) | 2.25 | — |
| Tensile Strength (psi) | 10,500–15,500 | ASTM D882 |
| Elongation (%) | 480%–550% | ASTM D882 |
| Tear (graves; g/ml) | 580–850 | ASTM D1004 |
| Water Vapor Transmission Rate (g/100 in$^2$/day; 100% R.H., 100° F.) | 7.50 | ASTM F1249 |

The results show that blended monolayer thermoplastic films possesses highly favorable toughness and durability characteristics. The films were suitability tough and durable for packaging meat products.

The blended monolayer thermoplastic films were then heat tested to evaluate an ideal use temperature for the test films. The test film functioned ideally up to temperatures of about 400° F. Thus, the blended monolayer thermoplastic films were an excellent candidate both for high temperature cooking applications, for example to cook whole muscle meats, as well as for a variety of industrial applications that require durability, flexibility, and ability to withstand high temperatures.

Example 2

Ability to Brown Meats

A test bag was prepared from a blended monolayer thermoplastic film to determine whether meat products browned during high temperature cooking applications. A blended monolayer thermoplastic film, comprising 48 weight percent nylon-6, 32 weight percent nylon-6,6, and 20 weight percent polyester elastomer, based on the total weight of said monolayer thermoplastic film, was tested under high temperature cooking conditions. A pair of whole-muscle turkey roasts (approximately 4 lb each) were vacuum heat sealed within the test bag. Vacuum sealing caused direct contact between the test bag and the turkeys. A conventional oven was preheated to 400° F., and the bagged turkeys were placed therein for a cooking time of 40 min.

After 40 minutes, browning was observed at all surfaces where the turkeys were in direct contact with the test bag. This test showed that the test bags permit browning of whole-muscle food items during high temperature cooking applications, while withstanding high temperatures cooking conditions for a duration of time sufficient to complete the cooking process. Further, the bags were easily and effectively vacuum heat sealed to provide secure and durable packaging for meat products.

Example 3:

Ability to Brown Meats with Minimal Meat Adhesion

A test bag was prepared from a blended monolayer thermoplastic film to determine whether high temperature cooking bags exhibited minimal meat adhesion after a meat product was browned during a high temperature cooking conditions. A test bag was prepared using a blended monolayer thermoplastic film comprising 48 weight percent nylon-6, 32 weight percent nylon-6,6, and 20 weight percent polyester elastomer, based on the total weight of said monolayer thermoplastic film. Three 6-lb chickens were successfully vacuum heat sealed within the test bag. The chickens were pre-prepared with "enhancements", i.e., seasonings, to simulate commercial cooking conditions. Cooking was performed at 425° F. in a conventional oven for 90 minutes.

The chickens exhibited favorable browning, and were easily disengaged from the test bag without adhesion between the chickens and the test bag. Thus, browning and favorable adhesion characteristics were simultaneously achieved through use of film bags constructed from the blended monolayer thermoplastic films. The bags were also easily and effectively heat sealed to provide a durable containment environment.

Example 4

Ability to Brown Meats with Minimal Meat Adhesion—Small-Sized Product

A test bag was prepared from a blended monolayer thermoplastic film to determine, when cooking smaller meat products, whether high temperature cooking bags exhibited minimal meat adhesion after the small meat product was browned during a high temperature cooking conditions. A test bag was prepared using a blended monolayer thermoplastic film comprising 48 weight percent nylon-6, 32 weight percent nylon-6,6, and 20 weight percent polyester elastomer, based on the total weight of said monolayer thermoplastic film. A small turkey breast weighing approximately 0.25 to 0.5 lb was vacuum sealed within the test bag. The turkey was cooked at 375° F. for 90 minutes.

The small turkey breast exhibited browning, and no adhesion between the turkey and the test bag. Accordingly, favorable browning and adhesion characteristics are attained, even when cooking smaller food items.

The disclosures of each patent, patent application and publication cited or described in this document are hereby incorporated herein by reference, in their entirety.

Those skilled in the art will appreciate that numerous changes and modifications can be made to the preferred embodiments of the invention and that such changes and modifications may be made without departing from the spirit of the invention. It is, therefore, intended that the appended claims cover all such equivalent variations as fall within the true spirit and scope of the invention.

What is claimed is:

1. A high temperature food preparation bag comprising:
a sealed end;
at least one side wall extending away from said sealed end, each of said at least one side wall having a distal edge; and
an open end defined by said distal edge or said distal edges;
wherein said bag is formed from a blended monolayer thermoplastic film comprising from about 10 to about 90 weight percent, based on the total weight of said blended monolayer thermoplastic film, of polyamide, wherein said polyamide is one or more nylon homopolymer and, from about 10 to about 90 weight percent, based on the total weight of said blended monolayer thermoplastic film, of polyester elastomer;
wherein said blended monolayer thermoplastic film has a thickness from about 0.45 mil to about 7.0 mil;
wherein said bag is capable of withstanding cooking temperatures of 425° F.

2. The high temperature food preparation bag of claim 1, wherein said nylon polymer is nylon-6, nylon-6,6, or combinations thereof.

3. The high temperature food preparation bag of claim 1 wherein said blended monolayer thermoplastic film comprises:
from about 40 to about 60 weight percent, based on the total weight of said monolayer thermoplastic film, of nylon-6;
from about 20 to about 40 weight percent, based on the total weight of said monolayer thermoplastic film, of nylon-6,6; and
from about 10 to about 30 weight percent, based on the total weight of said monolayer thermoplastic film, of polyester elastomer.

4. The high temperature food preparation bag of claim 1 wherein said blended monolayer thermoplastic film comprises, based on the total weight of said monolayer thermoplastic film, about 48% nylon-6, about 32% nylon-6,6, and about 20% polyester elastomer.

5. The high temperature food preparation bag of claim 1 wherein said blended monolayer thermoplastic film has a thickness from about 1.0 mil to about 2.5 mil.

6. The high temperature food preparation bag of claim 1 wherein said blended monolayer thermoplastic film provides a water vapor transmission rate of about 5 g/100 in$^2$/day or more at 100% relative humidity and 100° F.

7. The high temperature food preparation bag of claim 1 wherein said blended monolayer thermoplastic film has a water vapor transmission rate of about 5 g/100 in$^2$/day to about 10 g/100 in$^2$/day at 100% relative humidity and 100° F.

8. The high temperature food preparation bag of claim 1 wherein said blended monolayer thermoplastic film has a water vapor transmission rate of about 7.5 g/100 in2/day at 100% relative humidity and 100° F.

9. The high temperature food preparation bag of claim 1 wherein said blended monolayer thermoplastic film has a tensile strength of about 9,000 psi to about 16,500 psi.

10. The high temperature food preparation bag of claim 1 wherein said blended monolayer thermoplastic film has a tensile strength of about 10,500 psi to about 15,500 psi.

11. The high temperature food preparation bag of claim 1 wherein said blended monolayer thermoplastic film displays an elongation of about 450% to about 600%.

12. The high temperature food preparation bag of claim 1 wherein said blended monolayer thermoplastic film displays an elongation of about 480% to about 550%.

13. The high temperature food preparation bag of claim 1 wherein said blended monolayer thermoplastic film displays tear strength initiation at about 550 g/mil to about 900 g/mil.

14. The high temperature food preparation bag of claim 1 wherein said blended monolayer thermoplastic film displays tear strength initiation at about 580 g/mil to about 850 g/mil.

15. The high temperature food preparation bag of claim 1 wherein said blended monolayer thermoplastic film possesses an area yield of about 10,500 in2/lb.

16. The high temperature food preparation bag of claim 1 wherein said blended monolayer thermoplastic film is produced by cast film extrusion, biaxial orientation film processing, sheet extrusion, profile extrusion, or blown film extrusion.

* * * * *